Patented Dec. 13, 1938

2,140,183

UNITED STATES PATENT OFFICE 2,140,183

METHOD OF TREATING WELLS

Fritz Bresler, Berkeley, Calif., assignor to Shell Development Company, San Francisco, Calif., a corporation of Delaware No Drawing. Application July 3, 1936,
Serial No. 88,832

8 Claims. (Cl. 166—21)

This invention relates to methods for increasing the production of wells and is more specifically concerned with a process for the removal of substantially acid-insoluble deposits obstructing the flow of fluids through the formation.

The decrease in production of oil and gas wells may be due to various causes besides actual exhaustion. The chief of these causes are: accumulation of gummy, waxy or paraffinic solid matter on the walls of the boreholes; clogging due to the action of mud fluids used during drilling; clogging of the pores, crevices, capillaries and flow channels of the producing formation due to the precipitation of mineral deposits from the water in the well. For example, calcium carbonate may be deposited in the well walls from water containing calcium bicarbonate; other secondary deposits, such as calcium sulfate, deposited within the producing formation, have an important role in clogging the flow channels and thus contribute to the production decline of the well.

Various chemical treatments, such as treatments with acids, have been proposed to remove the clogging matter and to increase the production of wells. Hydrochloric acid treatment is particularly effective in the case of wells sunk through limestone strata.

In treating limestone and dolomite formations, the acid actually dissolves the limestone from the fractures, fissures, cracks, flow channels, etc. of the formations, thereby enlarging all such passages and increasing the permeability of the formation. The acid also dissolves some of the secondary deposits, such as calcite crystals, which are deposited on the walls of the small cavities or caverns of the formations and their interconnecting passages which may range in size from capillaries to relatively large channels.

There are, however, disadvantages attending the use of hydrochloric acid and other similar acids in well treatment. These acids are not able effectively to dissolve certain inorganic deposits, such as calcium sulfate, from the walls of the flow channels of the formation. For example, they dissolve easily the calcium salts of some weak acids, such as calcium carbonate; however, their action on the calcium salts of strong acids, such as calcium sulfate, is ineffective for practical purposes.

It has been discovered by microscopic examination of actual cores from wells giving negative results with acid treatment, that one of the major causes of their failure to respond to treatment in the presence of certain secondary deposits, such as calcium sulfate, on the walls of the flow channels and capillaries. Such deposits may occur naturally in the formation, or result from a previous treatment of the wall with acids or drilling materials. These deposits, being insoluble in hydrochloric acid prevent the acid from reaching the walls of the flow channels and capillaries and from enlarging them by reaction and solution. As a result, hydrochloric acid treatment alone is ineffective in these cases; the permeability of the producing horizon is increased but slightly, if at all, and the general result of treating such a formation by the present standard methods is negative.

According to the present invention, a continuous substantially impermeable surface on the formation rock is made permeable by a chemical method of at least partially removing from the walls of the flow channels and capillaries such deposits, substantially insoluble in acid alone, in order to enable the acid to attack the entire surface of the flow channels and capillaries. Any change, physical or chemical, imposed by the treating chemical, the result of which is to allow the acid to reach the formation rock more effectively, is sufficient for the purposes of the invention; for example, any change resulting in a contraction or expansion, or other change in the physical as well as the chemical nature of the acid-insoluble layer.

It has been found that especially favorable results can be obtained according to this invention by introducing into the formation, either separately or in combination with the treating acid, a chemical capable of reacting with the acid-insoluble deposits to form by metathesis, or double decomposition, a more insoluble product than the original difficultly soluble deposits. This more insoluble product may remain in a very finely divided suspension in the treating liquid and be flushed from the formation when the flow of the treating liquid is reversed, or it may remain within the formation and be dissolved and removed by means of a solvent. Sometimes only a light treatment of the difficultly soluble formations with a reagent producing still less soluble substance or substances is sufficient to loosen such a formation, partly disintegrate it and thus expose a more soluble portion thereof to the action of suitable solvents or reagents.

In practicing the invention, the following procedure may be used. The well is first filled with oil and a treating solution is then pumped into the well. This treating solution may consist of an acid, such, for example, as hydrochloric, containing a soluble salt, such, for example, as barium chloride, capable of reacting with acid insoluble salts deposited in or forming the flow channels and capillaries of the formation, such, for example, as calcium sulfate, to form still more insoluble salts, such as barium sulfate. When the desired amount of the treating solution has been introduced into the formation, the well is shut in to allow the reaction to take place. Before the acid is completely neutralized, the flow of the partially spent acid is reversed by swabbing and pumping, in order to flush the soluble chlorides and the insoluble salts formed (barium sulfate). After such a treatment, the formation is found to be much more permeable, its resistance to the flow of fluid being considerably decreased. The attack by the acid-containing salts soluble therein is effective whether the formation be saturated with oil or water or both.

Besides water-soluble salts of barium, such as barium chloride, the following water-soluble compounds of barium, lead, and strontium have been found very effective in treating gypsum and similar difficultly soluble deposits or formations: barium acetate, barium bromide, barium iodide, barium hydroxide, barium nitrate, lead acetate, lead nitrate, strontium acetate, strontium chloride, strontium bromide, strontium iodide and strontium nitrate.

Any liquid capable of dissolving the above reagents may be used in treating wells according to the present invention. Among the particularly suitable liquids are: aqueous hydrochloric, hydrobromic, hydrofluoric, nitric and chloracetic acids; for example, 15% hydrochloric acid.

The simultaneous action of the acid and of a suitable salt dissolved therein was found to be particularly effective for treating acid-resistant formations. However, it is not necessary that the soluble compound, which reacts with the deposits, be introduced into the formation together with the acid. A fresh water or brine solution of the salt reactant can first be introduced into the formation, and then followed by an acid solution charge. Such procedure may be followed with especial advantage in cases where it is desired to remove the acid-insoluble deposits, such as calcium sulfate, by forming an acid soluble salt, such as calcium carbonate. This may be accomplished by, first, treating the formation with an aqueous solution of soda ash, thereby converting at least some calcium sulfate into calcium carbonate and disrupting the impermeable surface of the formation, and then treating the well with a solution of HCl to clean the treated formation by dissolving calcium carbonate. By this method, any danger of clogging the formation by insoluble fines such as barium sulfate is avoided.

The following salts of weak acids may be used for this purpose in non-acidic solutions, and, if desired, followed by an acid treatment, as explained above: ammonium, sodium or potassium carbonates; ammonium, sodium or potassium oxalates; ammonium, aluminum, chromium, magnesium, sodium or potassium tartrates. Sodium carbonate is preferred from an economic standpoint.

The following specific examples of practicing this invention are given by way of illustration. The well to be treated, which did not respond to an ordinary acid treatment, is swabbed, bailed and cleaned out. Tubing is run in, and the well equipped to the pump. After a pumping test, the standing valve is removed. About 55 barrels of oil are pumped into the tubing until the tubing and the casing are filled to the top, the object being to protect the metallic parts of the equipment from the action of the acid. A charge of 1000 gallons of 15% hydrochloric acid containing ½ pound of barium chloride per gallon is then pumped down the tubing, followed by about 30 barrels of oil to clear the tubing and to force the acid into the producing formation. Normally the pressure rises considerably until the acid begins to enter the formation; however, at this point the pressure usually drops, and the remainder of the acid can be siphoned into the tubing under vacuum. During the introduction of the acid, the casinghead is kept closed unless excessive pressure is developed, when sufficient oil is allowed to flow from the casing to reduce the pressure. The well is then shut in and allowed to stand for about 3 hours, until a partial neutralization of the acid results from its reaction with the formation. At the end of the period the pumping equipment is replaced in the tubing and pumping resumed. The pump brings up the oil admixed with spent acid containing a considerable quantity of chlorides in solution together with suspended insoluble fines, the latter as a result of the removal of the obstructing acid-insoluble matter from the formation. The net-permeability of the formation may be increased severalfold, and, as a result of this treatment, the potential of the well raised from about 30 barrels per day by swabbing to about 200 barrels per day on the pump.

When it is desired to treat a well with a salt introduced into the formation separately from the acid, the above procedure may be modified as follows. After the tubing and casing has been filled with oil, 1000 gallons of a $Na_2CO_3$ solution, containing ½ pound of sodium carbonate per gallon of the solution, are pumped into the tubing, followed by about 30 barrels of oil to clear the tubing and to force the sodium carbonate solution into the formation. The well is then shut in for about 24 hours to allow the desired metathesis reaction to take place. At the end of this period the pumping equipment is replaced in the tubing and pumping is resumed in order to flush the treated portion of the formation. This preliminary treatment of the well may be followed by the normal acid treatment as described above.

In the case of high-pressure wells, it is necessary first to kill the well with oil, according to methods known in the art.

In wells in which oil and water are produced from independent strata, it may be desirable to shut the water formation off by means of a packer, or by a chemical method of water shut-off, as practiced in the art. If water and oil are produced from the same formation, it will be necessary to take into account the possible resultant dilution of the acid solution or the aqueous solution containing the reactant salt by the introduction of more concentrated solutions.

The following examples show the results of treating typical oil-well cores according to the method of the present invention. A sample core taken from a dolomitic formation which showed negative results when treated with hydrochloric acid by the standard method, was found on analysis to contain 15.35% calcium sulfate. Microscopic examination of the core showed that the calcium sulfate was deposited on the walls of the pores, capillaries and flow channels. After treatment with hydrochloric acid containing barium chloride it was clearly discernible that most of the calcium sulfate had been removed from the walls of the flow channels as the result of the metathesis with barium chloride. The rate of reaction with the core sample was obtained by measuring the volume of carbon dioxide gas evolved as a function of the time of reaction. In order to control the rate of reaction for purposes of accurate measurement, 3.5% hydrochloric acid was used; the sample was crushed to pass a C-8 mesh screen. In five minutes of reaction time, 2.0 c. c. of carbon dioxide were evolved from 3 grams of sample (containing oil), using 15 c. c. of 3.5% hydrochloric acid solution alone. However, when 3 grams of the sample were treated with 15 c. c. of 3.5% hydrochloric acid containing 2.5 grams of barium chloride, 12.5 c. c. of carbon dioxide were evolved in 5 minutes, thus giving a six-fold increase in the rate of solution of the dolomite sample.

A second similar experiment with a core sample of dolomite containing 7.89% calcium sulfate, showed 5.5 c. c. carbon dioxide evolved in 5 minutes when treated with hydrochloric acid alone, as compared with 26.5 c. c. of gas evolved in the same time when treated with hydrochloric acid containing barium chloride.

In a third experiment with a dolomite core showing no calcium sulfate on analysis, the rate of reaction was practically the same for acid with and without barium chloride.

Using a section of a core of dolomite showing 5.75% calcium sulfate, upon treatment with 25 c. c. of 3.5% hydrochloric acid containing 4.2 gr. of $BaCl_2$ $2H_2O$ for 3.5 minutes, the relative permeability increased from 0.35 to 14.8.

While the present method is suitable for application to any clogged or partially clogged wells which produce oil, gas or water, it is particularly useful in treating wells in limestone or dolomitic strata, or wells sunk through limey sands, sands containing cementing materials, soluble in acid, or sands which have been mudded with calcareous drilling muds.

It is understood that the process of this invention may be combined with any other desired process of well treatment. Thus, when the pores and flow channels of the formation are clogged, besides acid-insoluble, inorganic compounds, such as calcium sulfate, by acid-insoluble organic deposits, such as paraffinic, asphaltic, gummy or waxy deposits, the treatment of the well according to the present invention may be combined or preceded by a washing treatment with an organic solvent for the removal of said organic deposits, according to methods known in the art.

It is likewise understood that any desired inhibitors may be added to the acids used according to the present invention.

I claim as my invention:

1. In the process of increasing the production of a well by disintegrating difficultly soluble deposits of calcium sulfate, the steps of introducing into the well a liquid solution comprising a salt capable of forming with said deposits a sulfate less soluble in the liquid solution than calcium sulfate, forcing said solution into the formation, allowing said deposits to disintegrate as the result of reaction with said salt, and withdrawing the solution and the disintegrated matter from the well.

2. In the process of increasing the production of a well by disintegrating deposits of difficultly soluble calcium sulfate, the step of treating said deposits with a liquid solution comprising a substance capable of forming with said deposits a sulfate less soluble in the liquid solution than calcium sulfate, and a calcium salt soluble in said solution.

3. In the process of increasing the production of a well by disintegrating deposits of difficultly soluble calcium sulfate, the steps of introducing into the well an aqueous solution comprising a substance capable of forming with said deposits a calcium salt less soluble in water than calcium sulfate, but soluble in strong acids, withdrawing the treating liquid from the well, introducing into the well strong acid, dissolving therein the calcium salt formed by the first treatment, and withdrawing the second treating liquid from the well.

4. In the process of claim 3, using a solution of water soluble salt selected from the group consisting of: ammonium, sodium and potassium carbonates; ammonium, sodium and potassium oxalates; ammonium, sodium, potassium chromium and magnesium tartrates.

5. In the process of increasing the production of a well by disintegrating difficultly soluble deposits of calcium sulfate, the step of treating said deposits with an aqueous solution comprising a water-soluble salt of a metal selected from the group consisting of barium, strontium and lead.

6. In the process of increasing the production of a well by disintegrating difficultly soluble deposits of calcium sulfate, the steps of introducing into the well an acid solution comprising a salt capable of forming with said deposits a sulfate less soluble in said solution than calcium sulfate, forcing said acid solution into the formation, allowing said deposits to disintegrate as a result of reaction with said salt, and withdrawing the acid solution and the disintegrated matter from the well before said acid solution has become completely neutralized.

7. In the process of increasing the production of a well by disintegrating difficultly soluble deposits of calcium sulfate, the step of treating said deposits with an acid aqueous solution comprising a salt of a metal selected from the group consisting of barium, strontium and lead, allowing said deposits to disintegrate as the result of reaction with said salt, and withdrawing the acid solution and the disintegrated matter from the well before said acid solution has become completely neutralized.

8. The process of claim 7, using an aqueous solution of an acid selected from the group consisting of: hydrochloric, hydrobromic, hydrofluoric, nitric and chloracetic acids.

FRITZ BRESLER.